US012317053B2

(12) United States Patent
Feng et al.

(10) Patent No.: US 12,317,053 B2
(45) Date of Patent: May 27, 2025

(54) DOUBLE-SIDED SOUND DEVICE

(71) Applicant: AAC Microtech (Changzhou) Co., Ltd., Jiangsu (CN)

(72) Inventors: Xiaoqiong Feng, Changzhou (CN); Sheng Ren, Changzhou (CN); Xuedong Lv, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 239 days.

(21) Appl. No.: 18/325,076

(22) Filed: May 29, 2023

(65) Prior Publication Data

US 2024/0179473 A1 May 30, 2024

Related U.S. Application Data

(63) Continuation of application No. PCT/CN2023/084856, filed on Mar. 29, 2023.

(30) Foreign Application Priority Data

Nov. 30, 2022 (CN) ........................ 202223195636.5

(51) Int. Cl.

| | |
|---|---|
| ***H04R 9/06*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............... *H04R 9/063* (2013.01); *H04R 7/04* (2013.01); *H04R 7/18* (2013.01); *H04R 9/025* (2013.01); *H04R 9/046* (2013.01); *H04R 9/06* (2013.01); *H04R 2209/026* (2013.01); *H04R 2400/11* (2013.01)

(58) Field of Classification Search

CPC . H04R 7/04; H04R 7/18; H04R 9/025; H04R 9/046; H04R 9/06; H04R 9/063; H04R 2209/026; H04R 2400/11

See application file for complete search history.

(56) References Cited

U.S. PATENT DOCUMENTS

| | | | | |
|---|---|---|---|---|
| 10,631,096 B1 * | 4/2020 | Garcia Selva | ........... | H04R 9/06 |
| 12,149,908 B2 * | 11/2024 | Lv | .......................... | H04R 9/025 |
| 2016/0021441 A1 * | 1/2016 | Shao | ........................ | H04R 1/24<br>381/412 |
| 2024/0348980 A1 * | 10/2024 | Zhang | .................... | H04R 9/063 |

* cited by examiner

*Primary Examiner* — Huyen D Le
(74) *Attorney, Agent, or Firm* — Wiersch Law Group

(57) ABSTRACT

A double-sided sound device includes a first vibration system, a second vibration system, and a magnetic circuit system, and the second vibration system is disposed at a lower side of the first vibration system. The magnetic circuit system includes an inner magnet part, an outer magnet part, and non-magnetically conductive connectors. The inner magnet part includes a first inner pole core, two first inner magnetic steels, a second inner magnetic steel, and a second inner pole core. The outer magnet part includes a first outer pole core, a second outer pole core, and outer magnetic steels. The non-magnetically conductive connectors connect the second outer pole core and the first inner pole core. The double-sided sound device reduces a product size, and further reduces material costs.

8 Claims, 4 Drawing Sheets

A-A

A-A

B-B

DOUBLE-SIDED SOUND DEVICE

TECHNICAL FIELD

The present disclosure relates to a technical field of electroacoustic conversion, and in particular to a double-sided sound device.

BACKGROUND

Sound devices include single-sided sound devices and double-sided sound devices, and sound pressure levels of the double-sided sound devices far exceed sound pressure levels of the single-sided sound devices, so that the double-sided sound devices have more excellent acoustic performance.

Currently, the double-sided sound devices are generally to simply stack one single-sided sound device on a back surface of another one single-sided sound device, which result in an excessively large product volume of the double-sided sound devices. Moreover, the two single-sided sound devices which form one double-sided sound device each has own independent magnetic circuit system, high material costs are resulted.

Therefore, it is necessary to provide a new double-sided sound device to solve above technical problems.

SUMMARY

The present disclosure aims to solve above technical problems and provides a double-sided sound device which volume and material costs are reduced.

In order to achieve above aims, the present disclosure provides a double-sided sound device, including a first frame, a second frame, a first vibration system, a second vibration system, and a magnetic circuit system. The second frame is disposed at a lower side of the first frame, the first vibration system is disposed at an upper side of the first frame, the second vibration system is disposed at a lower side of the second frame, and the magnetic circuit system is disposed between the first vibration system and the second vibration system. The first vibration system includes a first vibrating diaphragm and a first voice coil, the first voice coil drives the first vibrating diaphragm to vibrate and generate sound. The second vibration system includes a second vibrating diaphragm and a second voice coil, the second voice coil drives the second vibrating diaphragm to vibrate and generate sound. The magnetic circuit system includes an inner magnet part, an outer magnet part, and non-magnetically conductive connectors, the outer magnet part is disposed at an outer side of the inner magnet part, and the non-magnetically conductive connectors connect the inner magnet part and the outer magnet part. The inner magnet part includes a first inner pole core, two first inner magnetic steels, a second inner magnetic steel, and a second inner pole core, the first inner pole core is close to the first vibrating diaphragm, the two first inner magnetic steels are fixed at a lower side of the first inner pole core and are disposed side by side along a long axis direction of the double-sided sound device, the second inner magnetic steel is disposed at lower sides of the two first inner magnetic steels, and the second inner pole core is fixed at a lower side of the second inner magnetic steel. The outer magnet part includes a first outer pole core, a second outer pole core, and outer magnetic steels, the first outer pole core is close to the first vibrating diaphragm, the second outer pole core is close to the second vibrating diagram, and the outer magnetic steels are clamped between the first outer pole core and the second outer pole core. The non-magnetically conductive connectors connect the second outer pole core and the first inner pole core, the first voice coil is inserted between the non-magnetically conductive connectors and the outer magnet part, and the second voice coil is inserted between the non-magnetically conductive connectors and the inner magnet part.

Furthermore, the first outer pole core is injection molded on the first frame, and the second outer pole core is injection molded on the second frame.

Furthermore, a length of each of the two first inner magnetic steels along a short axis direction of the double-sided sound device is greater than a length of the second inner magnetic steel along the short axis direction of the double-sided sound device.

Furthermore, the outer magnetic steels include a first outer magnetic steel, a second outer magnetic steel, a third outer magnetic steel, a fourth outer magnetic steel, a fifth outer magnetic steel, a sixth outer magnetic steel. The first outer magnetic steel and the second outer magnetic steel are disposed side by side at a first long axis side edge of the double-sided sound device along the long axis direction of the double-sided sound device, the third outer magnetic steel and the fourth outer magnetic steel are disposed side by side at a second long axis side edge of the double-sided sound device along the long axis direction of the double-sided sound device, the fifth outer magnetic steel is disposed at a first short axis side edge of the double-sided sound device, and the sixth outer magnetic steel is disposed at a second short axis side edge of the double-sided sound device.

Furthermore, the non-magnetically conductive connectors include a first non-magnetically conductive connector, a second non-magnetically conductive connector, a third non-magnetically conductive connector, and a fourth non-magnetically conductive connector. The first non-magnetically conductive connector is disposed at a first long axis side edge of the double-sided sound device and is located at a junction of the two first inner magnetic steels, the second non-magnetically conductive connector is disposed at a second long axis side edge of the double-sided sound device and is located at the junction of the two first inner magnetic steels, the third non-magnetically conductive connector is disposed at a first short axis side edge of the double-sided sound device, and the fourth non-magnetically conductive connector is disposed at a second short axis side edge of the double-sided sound device.

Furthermore, the two first inner magnetic steels and the second inner magnetic steel are respectively magnetized along a vibration direction of the first vibration system and a vibration direction of the second vibration system, and a magnetizing direction of the two first inner magnetic steels and a magnetizing direction of the second inner magnetic steel are the same. The outer magnetic steels are magnetized along the vibration direction of the first vibration system and the vibration direction of the second vibration system, and a magnetizing direction of the outer magnetic steels is opposite to the magnetizing direction of the two first inner magnetic steels and the magnetizing direction of the second inner magnetic steel.

Furthermore, the non-magnetically conductive connectors are stainless steel connectors.

Furthermore, a shape and a size of the first vibrating diaphragm are the same as a shape and a size of the second vibrating diaphragm.

According to the double-sided sound device, the first vibration system and the second vibration system share the magnetic circuit system, which is compact in structure, reduces a product size, and further reduces material costs.

Moreover, a BL value of the first voice coil, that is, a force on the first voice coil in a magnetic field, is compensated through the two first inner magnetic steels and the second inner magnetic steel.

BRIEF DESCRIPTION OF DRAWINGS

In order to more clearly illustrate technical solutions in embodiments of the present disclosure, accompanying drawings that need to be used in the description of the embodiments are briefly described below, and it is obvious that the accompanying drawings in the following description are merely some embodiments of the present disclosure.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, but are not all embodiments. All other embodiments obtained by a person skilled in the art based on the embodiments of the present disclosure without creative efforts shall fall within protection scopes of the present disclosure.

Figure 1:
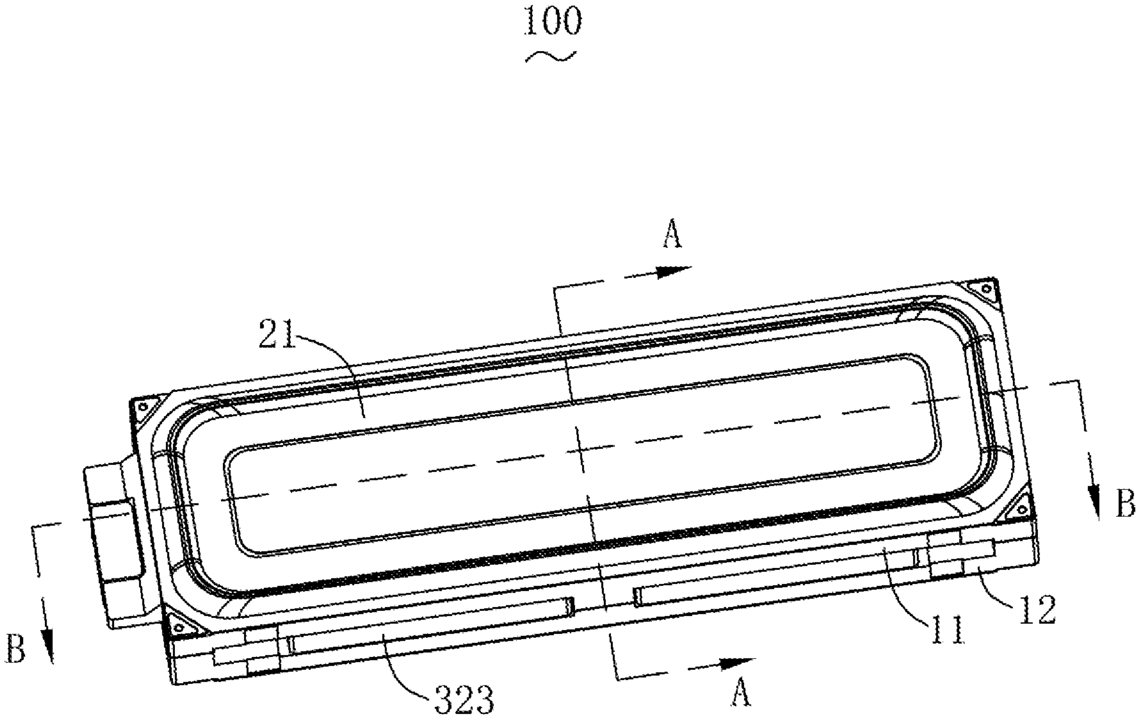
FIG. 1 is a three-dimensional schematic diagram of a double-sided sound device of the present disclosure.
Figure 2:
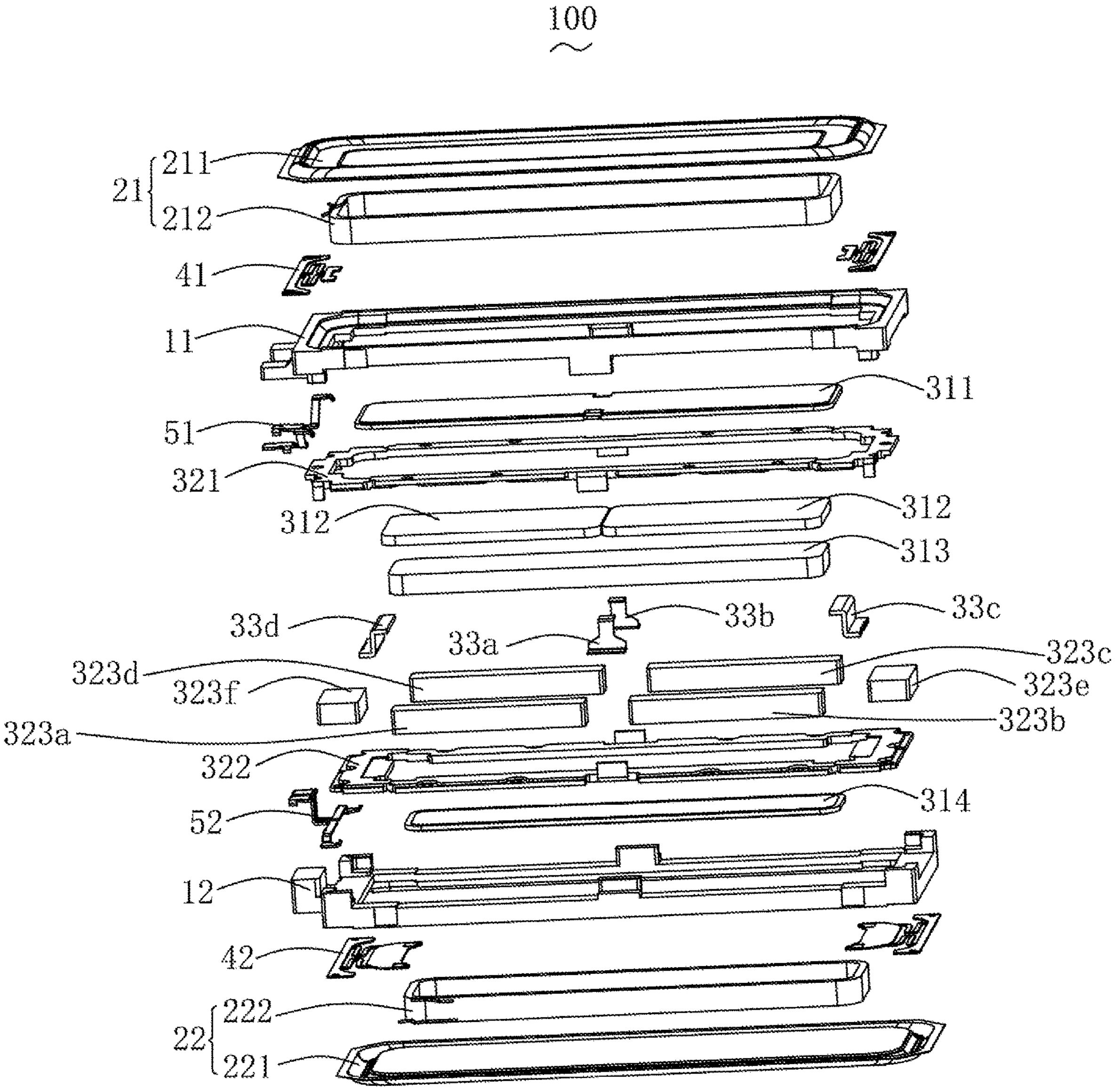
FIG. 2 is a three-dimensional schematic diagram of an exploded view of the double-sided sound device shown in FIG. 1.
Figure 3:
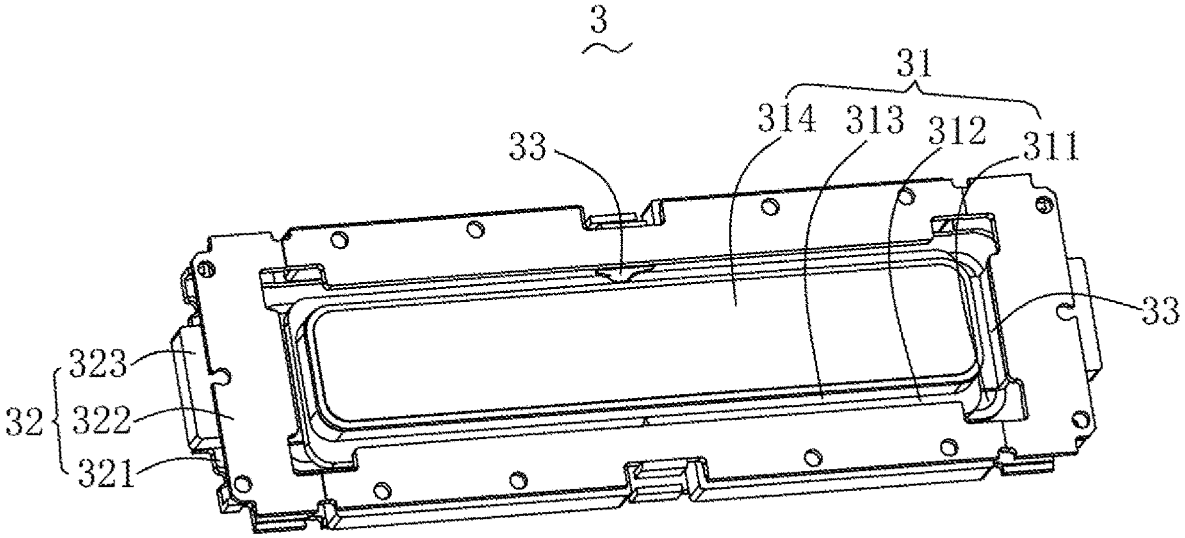
FIG. 3 is a three-dimensional schematic diagram of a magnetic circuit system of the double-sided sound device shown in FIG. 1.
Figure 4:
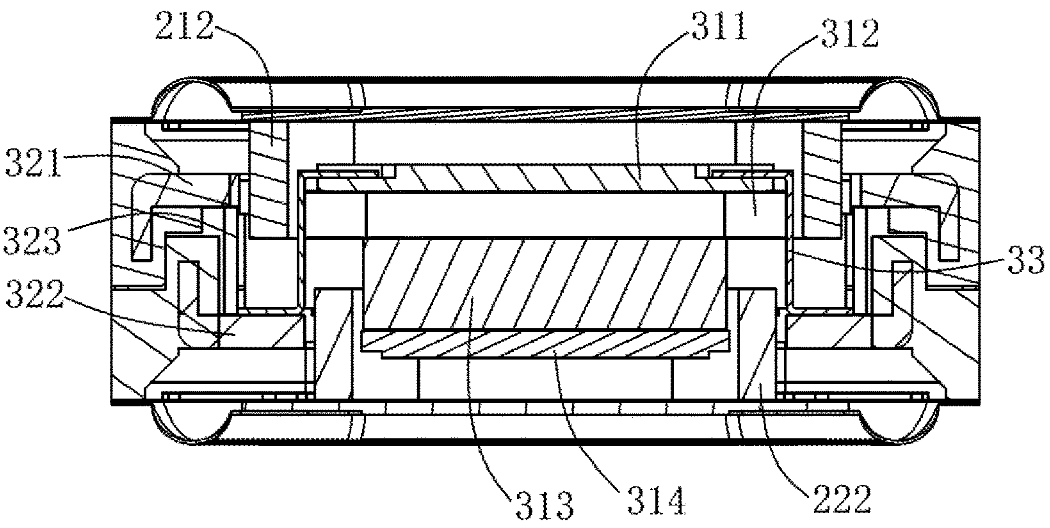
FIG. 4 is a schematic diagram of a cross-sectional view taken along the line A-A shown in FIG. 1.
Figure 5:
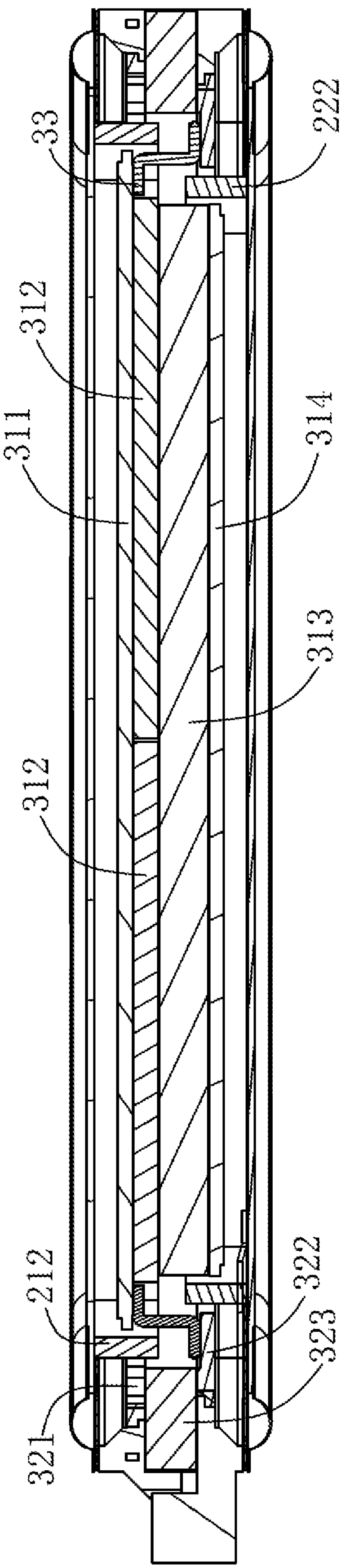
FIG. 5 is a schematic diagram of a cross-sectional view taken along the line B-B shown in FIG. 1.

Please refer to FIGS. 1-5, the present disclosure provides a double-sided sound device 100, including a first frame 11, a second frame 12, a first vibration system 21, a second vibration system 22, and a magnetic circuit system 3. The second frame 12 is disposed at a lower side of the first frame 11, the first vibration system 21 is disposed at an upper side of the first frame 11, the second vibration system 22 is disposed at a lower side of the second frame 12, and the magnetic circuit system 3 is disposed between the first vibration system 21 and the second vibration system 22.

The first vibration system 21 includes a first vibrating diaphragm 211 and a first voice coil 212, the first voice coil 212 drives the first vibrating diaphragm 211 to generate sound, and the first voice coil 212 is electrically connected to an external power supply through a first flexible circuit board 41 and a first external terminal 51. The second vibration system 22 includes a second vibrating diaphragm 221 and a second voice coil 222, the second voice coil 222 drives the second vibrating diaphragm 221 to vibrate and generate sound, and the second voice coil 222 is electrically connected to an external power supply through a second flexible circuit board 42 and a second external terminal 52. A shape and a size of the first vibrating diaphragm 211 are the same as a shape and a size of the second vibrating diaphragm 221.

The magnetic circuit system 3 includes an inner magnet part 31, an outer magnet part 32, and non-magnetically conductive connectors 33, the outer magnet part 32 is disposed at an outer side of the inner magnet part 31, and the non-magnetically conductive connectors 33 connect the inner magnet part 31 and the outer magnet part 32. The non-magnetically conductive connectors 33 are stainless steel connectors.

The inner magnet part 31 includes a first inner pole core 311, two first inner magnetic steels 312, a second inner magnetic steel 313, and a second inner pole core 314, the first inner pole core 311 is close to the first vibrating diaphragm 211, the two first inner magnetic steels 312 are fixed at a lower side of the first inner pole core 311 and are disposed side by side along a long axis direction of the double-sided sound device 100, the second inner magnetic steel 313 is disposed at lower sides of the two first inner magnetic steels 312, and the second inner pole core 322 is fixed at a lower side of the second inner magnetic steel 313. The outer magnet part 32 includes a first outer pole core 321, a second outer pole core 322, and outer magnetic steels 323, the first outer pole core 321 is close to the first vibrating diaphragm 211, the second outer pole core 322 is close to the second vibrating diagram 221, and the outer magnetic steels 323 are clamped between the first outer pole core 321 and the second outer pole core 322. The non-magnetically conductive connectors 33 connect the second outer pole core 322 and the first inner pole core 311, the first voice coil 212 is inserted between the non-magnetically conductive connectors 33 and the outer magnet part 32, and the second voice coil 222 is inserted between the non-magnetically conductive connectors 33 and the inner magnet part 31.

In the embodiment, the first outer pole core 321 is injection molded on the first frame 11, and the second outer pole core 322 is injection molded on the second frame 12.

A length of each of the two first inner magnetic steels 321 along a short axis direction of the double-sided sound device 100 is greater than a length of the second inner magnetic steel 313 along the short axis direction of the double-sided sound device 100.

The outer magnetic steels 323 include a first outer magnetic steel 323*a*, a second outer magnetic steel 323*b*, a third outer magnetic steel 323*c*, a fourth outer magnetic steel 323*d*, a fifth outer magnetic steel 323*e*, and a sixth outer magnetic steel 323*f*. The first outer magnetic steel 323*a* and the second outer magnetic steel 323*b* are disposed side by side at a first long axis side edge of the double-sided sound device 100 along the long axis direction of the double-sided sound device 100, the third outer magnetic steel 323*c* and the fourth outer magnetic steel 323*d* are disposed side by side at a second long axis side edge of the double-sided sound device 100 along the long axis direction of the double-sided sound device 100, the fifth outer magnetic steel 323*e* is disposed at a first short axis side edge of the double-sided sound device 100, and the sixth outer magnetic steel 323*f* is disposed at a second short axis side edge of the double-sided sound device 100.

The non-magnetically conductive connectors 33 include a first non-magnetically conductive connector 33*a*, a second non-magnetically conductive connector 33*b*, a third non-magnetically conductive connector 33*c*, and a fourth non-magnetically conductive connector 33*d*. The first non-magnetically conductive connector 33*a* is disposed at a first long axis side edge of the double-sided sound device 100 and is located at a junction of the two first inner magnetic steels 312, the second non-magnetically conductive connector 33*b* is disposed at a second long axis side edge of the double-sided sound device 100 and is located at the junction of the two first inner magnetic steels 312, the third non-magnetically conductive connector 33*c* is disposed at a first short axis side edge of the double-sided sound device 100, and the fourth non-magnetically conductive connector 33*d* is disposed at a second short axis side edge of the double-sided sound device 100.

The two first inner magnetic steels 312 and the second inner magnetic steel 313 are respectively magnetized along a vibration direction of the first vibration system 21 and a vibration direction of the second vibration system 22, and a magnetizing direction of the two first inner magnetic steels 312 and a magnetizing direction of the second inner magnetic steel 313 are the same. The outer magnetic steels 323 are magnetized along the vibration direction of the first vibration system 21 and the vibration direction of the second vibration system 22, and a magnetizing direction of the outer magnetic steels 312 is opposite to the magnetizing direction of the two first inner magnetic steels 312 and the magnetizing direction of the second inner magnetic steel 313.

According to the double-sided sound device, the first vibration system and the second vibration system share the magnetic circuit system, which is compact in structure, reduces a product size, and further reduces material costs. Moreover, a BL value of the first voice coil, that is, a force on the first voice coil in a magnetic field, is compensated through the two first inner magnetic steels and the second inner magnetic steel.

Above-mentioned embodiments are merely embodiments of the present disclosure, and it should be noted that, for a person skilled in the art of the present disclosure, improvements may be made without departing from the concept of the present disclosure, but these are all within the scope of protection of the present disclosure.

What is claimed is:

1. A double-sided sound device, comprising:
- a first frame;
- a second frame;
- a first vibration system;
- a second vibration system; and
- a magnetic circuit system;
- wherein the second frame is disposed at a lower side of the first frame, the first vibration system is disposed at an upper side of the first frame, the second vibration system is disposed at a lower side of the second frame, and the magnetic circuit system is disposed between the first vibration system and the second vibration system; the first vibration system comprises a first vibrating diaphragm and a first voice coil, the first voice coil drives the first vibrating diaphragm to vibrate and generate sound; the second vibration system comprises a second vibrating diaphragm and a second voice coil, the second voice coil drives the second vibrating diaphragm to vibrate and generate sound; the magnetic circuit system comprises an inner magnet part, an outer magnet part, and non-magnetically conductive connectors, the outer magnet part is disposed at an outer side of the inner magnet part, and the non-magnetically conductive connectors connect the inner magnet part and the outer magnet part; the inner magnet part comprises a first inner pole core, two first inner magnetic steels, a second inner magnetic steel, and a second inner pole core, the first inner pole core is close to the first vibrating diaphragm, the two first inner magnetic steels are fixed at a lower side of the first inner pole core and are disposed side by side along a long axis direction of the double-sided sound device, the second inner magnetic steel is disposed at lower sides of the two first inner magnetic steels, and the second inner pole core is fixed at a lower side of the second inner magnetic steel; the outer magnet part comprises a first outer pole core, a second outer pole core, and outer magnetic steels, the first outer pole core is close to the first vibrating diaphragm, the second outer pole core is close to the second vibrating diagram, and the outer magnetic steels are clamped between the first outer pole core and the second outer pole core; the non-magnetically conductive connectors connect the second outer pole core and the first inner pole core, the first voice coil is inserted between the non-magnetically conductive connectors and the outer magnet part, and the second voice coil is inserted between the non-magnetically conductive connectors and the inner magnet part.

2. The double-sided sound device according to claim 1, wherein the first outer pole core is injection molded on the first frame, and the second outer pole core is injection molded on the second frame.

3. The double-sided sound device according to claim 1, wherein a length of each of the two first inner magnetic steels along a short axis direction of the double-sided sound device is greater than a length of the second inner magnetic steel along the short axis direction of the double-sided sound device.

4. The double-sided sound device according to claim 1, wherein the outer magnetic steels comprise a first outer magnetic steel, a second outer magnetic steel, a third outer magnetic steel, a fourth outer magnetic steel, a fifth outer magnetic steel, a sixth outer magnetic steel; the first outer magnetic steel and the second outer magnetic steel are disposed side by side at a first long axis side edge of the double-sided sound device along the long axis direction of the double-sided sound device, the third outer magnetic steel and the fourth outer magnetic steel are disposed side by side at a second long axis side edge of the double-sided sound device along the long axis direction of the double-sided sound device, the fifth outer magnetic steel is disposed at a first short axis side edge of the double-sided sound device, and the sixth outer magnetic steel is disposed at a second short axis side edge of the double-sided sound device.

5. The double-sided sound device according to claim 1, wherein the non-magnetically conductive connectors comprise a first non-magnetically conductive connector, a second non-magnetically conductive connector, a third non-magnetically conductive connector, and a fourth non-magnetically conductive connector; the first non-magnetically conductive connector is disposed at a first long axis side edge of the double-sided sound device and is located at a junction of the two first inner magnetic steels, the second non-magnetically conductive connector is disposed at a second long axis side edge of the double-sided sound device and is located at the junction of the two first inner magnetic steels, the third non-magnetically conductive connector is disposed at a first short axis side edge of the double-sided sound device, and the fourth non-magnetically conductive connector is disposed at a second short axis side edge of the double-sided sound device.

6. The double-sided sound device according to claim 1, wherein the two first inner magnetic steels and the second inner magnetic steel are respectively magnetized along a vibration direction of the first vibration system and a vibration direction of the second vibration system, and a magnetizing direction of the two first inner magnetic steels and a magnetizing direction of the second inner magnetic steel are the same; the outer magnetic steels are magnetized along the vibration direction of the first vibration system and the vibration direction of the second vibration system, and a magnetizing direction of the outer magnetic steels is opposite to the magnetizing direction of the two first inner magnetic steels and the magnetizing direction of the second inner magnetic steel.

7. The double-sided sound device according to claim 1, wherein the non-magnetically conductive connectors are stainless steel connectors.

8. The double-sided sound device according to claim 1, wherein a shape and a size of the first vibrating diaphragm are the same as a shape and a size of the second vibrating diaphragm.

* * * * *